United States Patent [19]

Chandra et al.

[11] Patent Number: 4,553,872

[45] Date of Patent: Nov. 19, 1985

[54] LOAD CELL CLAMPING APPARATUS

[75] Inventors: Rangasami S. Chandra, Walnut Creek; Franklin P. Orlando, Morgan Hill, both of Calif.

[73] Assignee: FMC Corporation, Chicago, Ill.

[21] Appl. No.: 580,416

[22] Filed: Feb. 15, 1984

[51] Int. Cl.$^4$ .................................................. F16B 1/00
[52] U.S. Cl. ........................................ 403/25; 403/24; 403/338; 403/387; 73/855; 73/856; 269/249; 248/231.7
[58] Field of Search ................... 403/387, 338, 24, 76, 403/25; 269/249, 271; 73/855, 856; 248/228, 231.7

[56] References Cited

U.S. PATENT DOCUMENTS

| | | | |
|---|---|---|---|
| 2,246,089 | 6/1941 | Hargrave | 269/249 |
| 2,693,386 | 11/1954 | Renfroe | 269/249 |
| 3,052,462 | 9/1962 | Butler | 269/249 |
| 3,817,094 | 6/1974 | Montgomery et al. | 73/151 |

Primary Examiner—Cornelius J. Husar
Assistant Examiner—Todd G. Williams
Attorney, Agent, or Firm—H. M. Stanley; R. B. Megley

[57] ABSTRACT

Structure for mounting a load cell enclosure on a bending beam is disclosed, wherein the load cell enclosure has a pair of mounting flanges extending from the enclosure and the flanges each have opposed mounting and exposed surfaces. A swivel footed clamp is provided for contacting each flange exposed surface and a beam surface in a manner to firmly secure the flange mounting surfaces to the beam.

20 Claims, 5 Drawing Figures

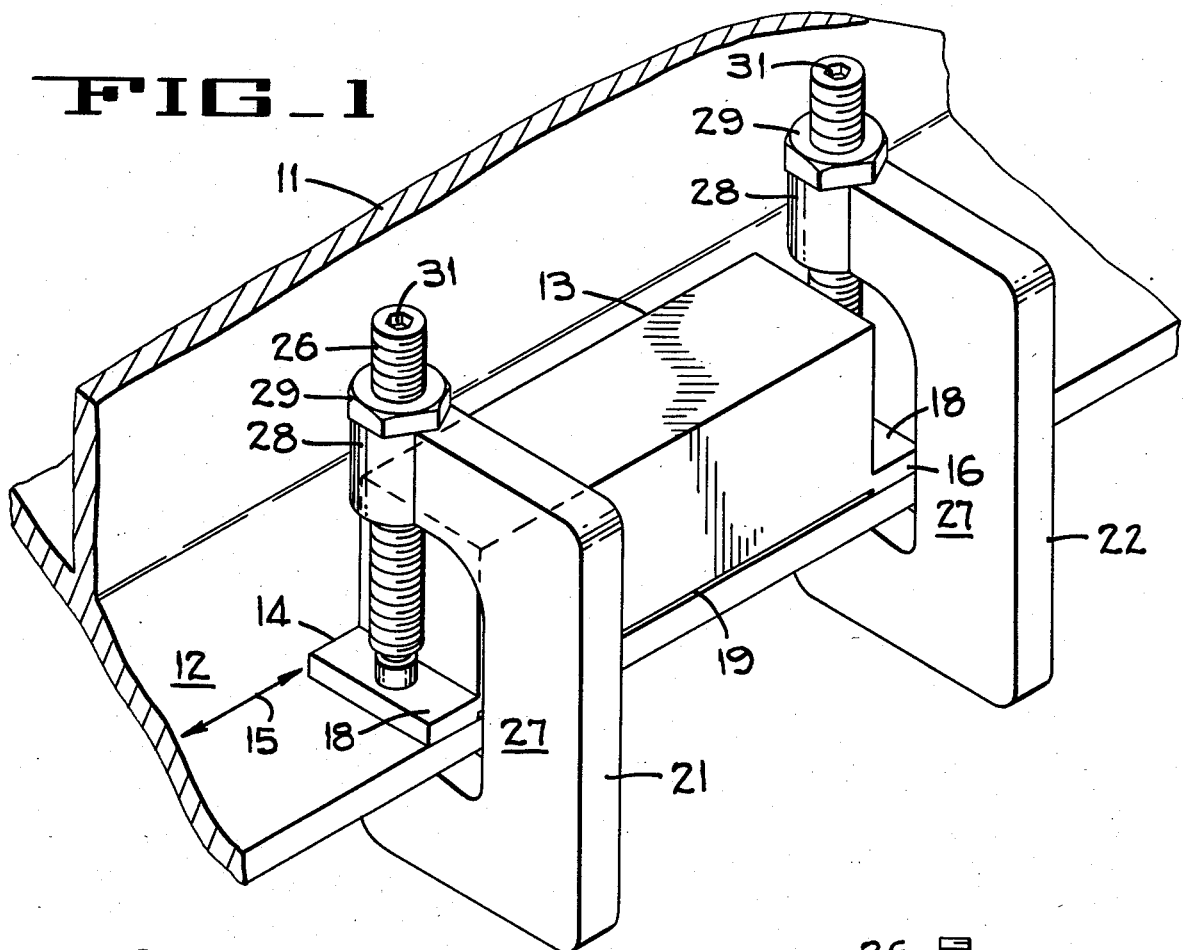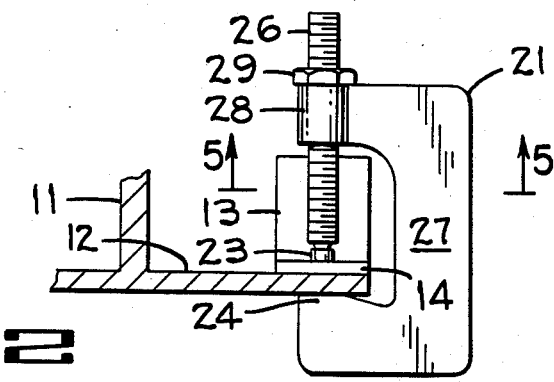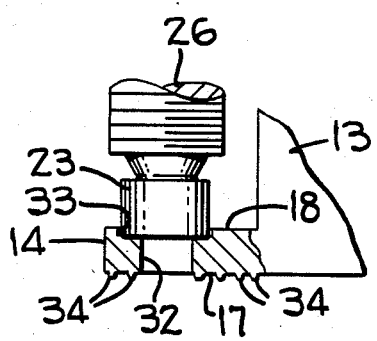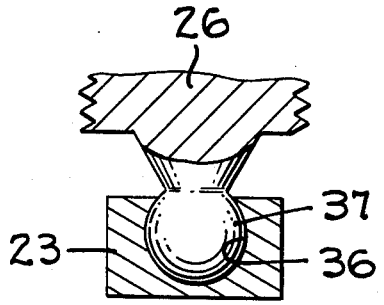

LOAD CELL CLAMPING APPARATUS

BACKGROUND OF THE INVENTION

1. Field of the Invention

This invention relates to structure for mounting an instrument on a beam to measure loading stress and more particularly to such structure for mounting a load cell on a beam in a pumping mechanism to measure stress therein during operation of the pumping mechanism.

2. Description of the Prior Art

As known to the Applicants, instruments of the aforementioned type have been mounted on beams included in oil pumping structure which are undergoing stress in oil field pumping operations by setting the instrument enclosure on the beam in the appropriate position and welding the opposite ends of the enclosure to the beam to permanently affix the instrument thereto.

SUMMARY OF THE INVENTION

In the present invention apparatus is provided for mounting a load cell enclosure securely to one surface of a beam which is subjected to bending stress to be measured by the load cell. Flanges extend outwardly in opposite directions from each side of the cell enclosure. A mounting surface and an opposing exposed surface appear on each flange. Clamping means have opposing jaws, one of which is adapted to contact the exposed flange surface and the other of which is adapted to contact the beam surface opposing the one beam surface. When the clamping means is tightened, pressure is applied between the flange mounting surface and the one beam surface which is sufficient to securely hold the load cell enclosure in place on the beam.

BRIEF DESCRIPTION OF THE DRAWINGS

FIG. 1 is a perspective view of the apparatus of the present invention.

FIG. 2 is a side elevation view of the apparatus of the present invention.

FIG. 3 is a detailed view, partially in section, of one portion of the present invention.

FIG. 4 is a detailed view, partially in section, of a swivelled foot on a clamp.

FIG. 5 is a horizontal section taken along the lines 5—5 of FIG. 2.

DESCRIPTION OF THE PREFERRED EMBODIMENT

As seen in FIG. 1 a metal beam 11 is shown which may be the oscillating or walking beam in an oil well pumping structure as seen in U.S. Pat. No. 3,817,094, Montgomery et al, issued June 18, 1974. The beam 11 may also represent that cross member called the equalizer bar which is situated at the tail end of the walking beam and transmits the motor driving power to the walking beam. The direction of beam stress of interest is shown in FIG. 1 by the dual direction arrow 15.

The beam 11 has a flat surface 12 upon which is shown an enclosure 13 for a beam stress measurement instrument. The enclosure may be seen to have flanges 14 and 16 extending outwardly from opposite ends thereof. The flanges each have a bottom or mounting surface 17 (FIG. 3) and an upper exposed surface 18. The bottom of the enclosure 13 is seen to be relieved at 19 between the mounting surfaces 17 on flanges 14 and 16. The enclosure is otherwise configured to house a stress measuring instrument in a manner such that when mounted on the beam the instrument measures the bending stress in the beam and therefore the load being supported by the beam.

As may also be seen in FIG. 1, a pair of C clamps 21 and 22 are positioned to clamp the flanges 14 and 16 firmly against the flat surface 12 of the beam 11. In FIG. 2 a side elevation view of the C clamp 21 is shown wherein opposing upper and lower jaws 23 and 24 respectively are depicted. The lower jaw 24 has a fixed flat surface which contacts that surface of the beam 11 which is opposite from the flat surface 12. The upper jaw 23 is mounted on the end of a threaded member 26. An interconnecting portion or member 27 on the C clamp 21 extends between the lower jaw 24 and a collar 28 having internal threads engaging the external threads on the threaded member. An internally threaded nut 29 is also threaded onto the threaded member. The nut is drawn tightly against the end of the collar after the threaded member is adjusted to apply the appropriate clamping force as is hereinafter described. The threaded member has a hexagonally shaped Allen wrench receiving socket 31 in the upper end thereof (FIG. 1) so that the threaded member may be rotated and advanced or withdrawn in the threads of the nut 29. As a result, the upper jaw 23 may be advanced toward or withdrawn away from the lower jaw 24 of each of the C clamps.

The upper surface 18 of each of the flanges 14 and 16 is shown in FIG. 3 as having a through hole 32 centrally located therein with a counterbore 33 surrounding the upper portion of the hole. The upper jaw 23 has a diameter which fits into the counterbore 33 (FIG. 3). The bottom of the counterbore 33 therefore is an annular area against which all of the clamping force of one C clamp is exerted. The purpose of the localization of the clamping force will be hereinafter explained.

The bottom or mounting surface 17 of flanges 14 and 16 is seen to have a plurality of parallel extending ridges or teeth 34 extending in a direction substantially orthogonal to the direction of the bending stress. The teeth are treated to obtain a hardness which is harder than the flat surface 12 of the beam 11 against which they impinge when the C clamps 21 and 22 are tightened to secure the flanges 14 and 16 tightly thereagainst. The hardened teeth 34 at their free ends may be seen to be narrower than at their bases to facilitate "biting in" at the surface 12 due to clamping force. The teeth 34 have therefore been found to provide a consequent high friction between the mounting surface 17 and the surface 12 of the beam.

The upper jaw 23 may be termed a clamp foot which is seen in FIG. 4 to have a spherical cavity 36 therein which surrounds a spherical member 37 protruding from the lower end of the threaded member 26. This provides a universal swivelling motion for the clamp foot or jaw 23 so that the bottom surface of the foot is in complete and uniform contact around the bottom surface of the counterbore 33. This assures that clamping force is applied both uniformly around the bottom surface of the counterbore 33 by the clamp foot 23 and orthogonally to the flanges 14 and 16.

The teeth 34 on the mounting surfaces 17 of the flanges 14 and 16 do not all "bite" into the beam surface 12. Too great a clamping force would be required to accomplish that. Therefore the aforementioned annular area at the bottom of the counterbore 33 is designed to support all of the clamping force and thereby localize the force. The flanges are not infinitely stiff and therefore the force applied by the clamp foot 23 is not transmitted uniformly across the mounting surface. The force is localized in the approximate area on the mounting surface 17 immediately opposite the annular bottom of the counterbore 33. The pressure is therefore higher at that part of the mounting surface. The pressure is high enough to cause the aforementioned "biting" action by the teeth 34 in the surface 12.

It may therefore be seen that when the enclosure 13 is placed as seen in FIG. 1 and the clamps 21 and 22 are placed as also seen in FIG. 1, a clamping force is created by advancing the threaded members 26 through the threaded collars 28 and then locking the members 26 in place by tightening the nuts 29. The clamping force is directed orthogonally against the annular area at the bottom of the counterbore 33 in the exposed upper surfaces 18 of the flanges 14 and 16, thereby forcing the teeth 34 on the mounting surface 17 into "biting" contact with the flat surface 12 on the beam 11. The upper foot or jaw 23 of each C clamp is captured in the counterbore 33 on the upper surfaces of the flanges so that the clamping force is localized and the clamps are securely fixed to the flange upper surfaces.

It should be noted that a preferred level of clamping force F has been determined empirically to be about fifteen hundred pounds. This force gives consistently good clamping results considering the disclosed configurations of the clamps 21 and 22 and the instrument enclosure 13 while prohibiting slippage between the surface 12 on the beam 11 and the mounting surfaces 17 on the instrument enclosure flanges. In one embodiment it was determined by measuring and summing the approximate areas of the contacting surfaces provided by the teeth 34 on each of the mounting surfaces 17 which are opposite the annular area in the bottom of counterbore 33 that a fifteen hundred pound force provides a localized pressure between the flat beam surface 12 and the mounting surfaces of the flanges 14 and 16 of approximately 140,000 psi. This pressure is several times the yield strength of the steel in the one surface 12 of the beam, that being approximately 36,000 psi. It has been found through observation that the teeth do become embedded in the beam surface 12 in the area beneath the clamping foot 23 to thereby provide a secure mechanical interlock between the enclosure 13 and the beam 11 when a clamping force of approximately fifteen hundred pounds is applied.

It is desirable to prevent load cell damage by limiting the amount of clamping force that may be applied by turning the threaded members 26 to advance them through the collars 28. Since it is known that fifteen hundred pounds clamping force is adequate to achieve stable mounting for the stress sensing transducer in the enclosure 13 and this level of force has been observed as non-damaging to the stress transducer, it is desirable to limit the maximum obtainable clamping force to some number slightly greater than fifteen hundred pounds, but yet positively less than the force which would damage the transducer by distorting the support structure for the sensing element in the enclosure. A known rectangular cross section for the interconnecting member or portion 27 (FIG. 5) of each C clamp was selected having specific dimensions, which by way of example may be one inch by three eighths inches. Calculations show that the maximum stress level in such a cross section for a clamping force level of fifteen hundred pounds exists at the surface 27a in FIG. 5 and is approximately 40,000 psi. Utilizing a safety factor to yield of 1.25, the required material yield strength for the interconnecting member 27 is 50,000 psi. This is a reasonable yield strength for available materials. Therefore high strength low alloy steel of 50,000 psi minimum yield strength is specified for the interconnecting member or portion 27 of the C clamps. Consequently the maximum clamping force is limited to 1.25 times the fifteen hundred pound force, or eighteen hundred seventy-five pounds. This is known to be below the potentially damaging clamping force level for the transducer within the enclosure 13.

It is also desired to obtain consistent installations in clamping the enclosures to the beam 11. By calibration with a compressive load cell, one hundred twenty inch pounds of clamp tightening torque applied at the hexagonal socket 31 will provide approximately fifteen hundred pounds clamping force. Therefore, installation torque for each clamp is recited as one hundred twenty inch pounds. It should further be noted that cleaning of the flat surface 12 to remove all paint and rust from the mounting area and subsequent proper corrosion protection is a part of the procedure for obtaining consistent installation of the enclosure 13 on the surface 12 of the beam 11 by means of the clamps as shown in FIG. 1.

Although the best mode contemplated for carrying out the present invention has been herein shown and described, it will be apparent that modification and variation may be made without departing from what is regarded to be the subject matter of the invention.

What is claimed is:

1. Apparatus for mounting a load cell enclosure securely to one surface of a beam subjected to bending stress to be measured by the load cell, comprising flanges extending in opposite directions from each side of the cell enclosure, a mounting surface and an opposing exposed surface on each flange, and clamping means having opposing jaws adapted to contact said exposed flange surface and the beam surface opposing the one beam surface, whereby pressure is applied between said mounting surface and the one beam surface to fix the load cell enclosure thereon.

2. Apparatus as in claim 1 wherein said mounting surface has a plurality of teeth formed thereon operating to increase friction between said mounting surface and the one beam surface.

3. Apparatus as in claim 2 wherein said teeth are formed in a plurality of substantially parallel rows extending in a direction substantially orthogonal to the direction of the bending stress.

4. Apparatus as in claim 1 wherein said clamping means comprises a swivelled foot on one of said opposing jaws.

5. Apparatus as in claim 4 wherein said opposing exposed surface on each flange has a counterbore formed therein, said counterbore being adapted to receive said swivelled foot, whereby said foot firmly engages said opposing exposed surface.

6. Apparatus as in claim 1 wherein said clamping means comprises means for limiting the clamping force which may be applied thereby.

7. Apparatus as in claim 6 wherein said clamping means comprises a member interconnecting said opposing jaws, and wherein said means for limiting comprises a predetermined cross section in said interconnecting member which fails structurally when a force is applied by said opposing jaws which is sufficient to fix the enclosure in place on the beam but less than a force potentially damaging to the load cell.

8. Apparatus for mounting a load cell enclosure securely to one surface of a beam subject to bending stress, comprising first and second flanges extending from opposite sides of the enclosure, a mounting surface on each of said flanges, a plurality of elongate teeth on each mounting surface extending in a direction substantially orthogonal to the direction of the bending stress, and means for applying a localized clamping force to said first and second flanges to thereby clamp said flanges to the one surface of the beam with said elongate teeth in pressure contact therewith.

9. Apparatus as in claim 8 wherein said teeth are arranged in substantially parallel array.

10. Apparatus as in claim 9 wherein said teeth are harder than the one surface of the beam, whereby said teeth may be embedded therein when pressure is applied between said mounting surface and the one beam surface.

11. Apparatus as in claim 8 wherein the free ends of said teeth are narrower than the bases thereof.

12. Apparatus as in claim 8 wherein said means for applying a localized clamping force has opposing jaws, and wherein one of said jaws comprises a swivelling foot.

13. Apparatus as in claim 12 wherein said mounting surface has a counterbore formed therein adapted to receive said swivelling foot, whereby said mounting surface is firmly engaged by said foot.

14. Apparatus as in claim 13 wherein said opposing jaws are joined by an interconnecting member, said interconnecting member having a cross section configured to fail structurally before sufficient clamping force is applied to the first and second flanges by said means for applying clamping force to potentially damage the load cell.

15. Apparatus for mounting a load cell enclosure securely in place on one surface of a beam subject to bending stress to be measured by the load cell, comprising a flange extending from each side of the enclosure in the direction of the bending stress, a mounting surface and an opposing surface on said flange, a plurality of substantially parallel elongate teeth extending along said mounting surface in a direction substantially orthogonal to the direction of the bending stress, and means for clamping having opposed jaws adapted to contact said flange opposing surface and an opposing beam surface to thereby apply pressure to force said mounting surface against the one beam surface.

16. Apparatus as in claim 15 wherein said teeth are harder than said one beam surface, whereby said elongate teeth are embedded in the one beam surface.

17. Apparatus as in claim 15 wherein said teeth have free ends which are narrower than their bases.

18. Apparatus as in claim 15 wherein said means for clamping comprises a first fixed jaw and a second movable swivelling jaw.

19. Apparatus as in claim 18 wherein said mounting surface has a counterbore formed therein adapted to receive said second swivelling jaw, whereby said flange is firmly engaged by said means for clamping.

20. Apparatus as in claim 15 wherein said means for clamping comprises an interconnecting member extending between said opposed jaws, said interconnecting member having a cross section configured to fail structurally before said means for clamping may apply force to said flange opposing surface sufficient to potentially damage said load cell.

* * * * *